United States Patent [19]
Cavagna

[11] Patent Number: 6,079,438
[45] Date of Patent: Jun. 27, 2000

[54] VALVE DEVICE FOR CONTROLLING THE FILLING LEVEL OF CYLINDERS AND THE LIKE WITH LIQUEFIED GASES

[75] Inventor: Carlo Cavagna, Calcinato, Italy

[73] Assignee: Cavagna Group International BV Amsterdam, Succursale di Lugano, Lugano, Switzerland

[21] Appl. No.: 09/321,233

[22] Filed: May 27, 1999

[30] Foreign Application Priority Data

Oct. 12, 1998 [IT] Italy .................................. MI98A2184

[51] Int. Cl.⁷ .......................... F16K 31/34; F16K 31/385; F16K 33/00
[52] U.S. Cl. .................... 137/315.08; 137/414; 137/415; 137/442; 137/446; 141/198
[58] Field of Search .............................. 137/15, 315, 318, 137/414, 415, 454, 442, 443, 445, 446, 451, 315.08; 141/198

[56] References Cited

U.S. PATENT DOCUMENTS

| | | | |
|---|---|---|---|
| 2,504,638 | 4/1950 | Browning | 137/446 |
| 2,911,000 | 11/1959 | Doyle | 137/414 |
| 2,979,067 | 4/1961 | Kern, Jr. et al. | 137/15 |
| 3,074,684 | 1/1963 | Doyle | 137/414 |
| 3,310,065 | 3/1967 | Godshalk | 137/414 |
| 4,072,164 | 2/1978 | Kaden | 137/446 |
| 4,281,775 | 8/1981 | Turner | 137/318 |
| 5,282,496 | 2/1994 | Kerger | 137/446 |
| 5,487,404 | 1/1996 | Kerger | 137/446 |
| 5,829,465 | 11/1998 | Garretson | 137/414 |

FOREIGN PATENT DOCUMENTS 605477  6/1960  Italy ...................................... 137/446

*Primary Examiner*—George L. Walton
*Attorney, Agent, or Firm*—Cantor Colburn LLP

[57] ABSTRACT

A valve device for controlling the filling level of cylinders and the like with liquefied gases, comprising an upper connecting body which can be coupled to a cylinder for liquefied gas and forming a tubular gas infeed element which ends with a coupling body which is associable with a lower connecting body in order to retain a membrane for closing openings for feeding gas into the cylinder, and a valve control element which is controlled by a float and interacts with the membrane; the device further comprising clinching means for the mutual clamping of the upper connecting body and the lower connecting body.

6 Claims, 2 Drawing Sheets

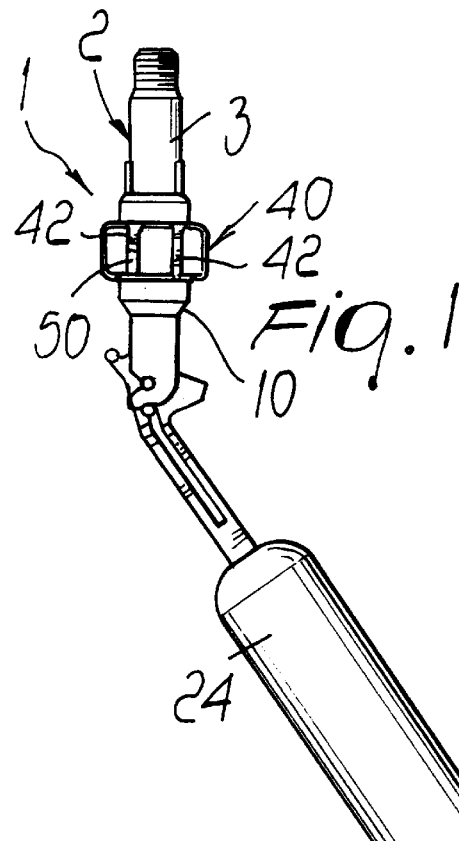
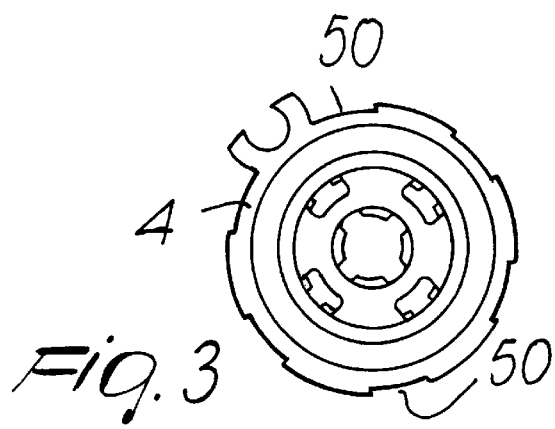
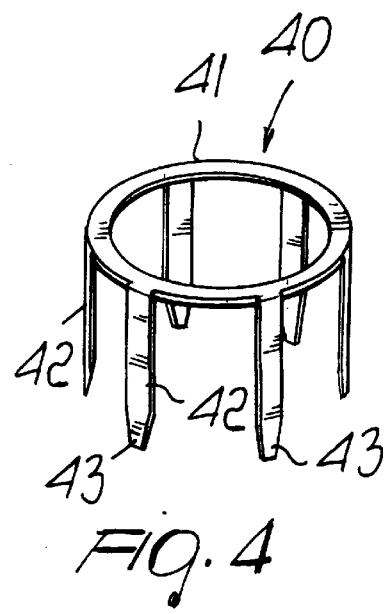

VALVE DEVICE FOR CONTROLLING THE FILLING LEVEL OF CYLINDERS AND THE LIKE WITH LIQUEFIED GASES

BACKGROUND OF THE INVENTION

The present invention relates to a valve device for controlling the filling level of cylinders and the like with liquefied gases.

U.S. patent application Ser. No. 09/047.511 discloses a valve device for controlling the level to which cylinders and the like are filled with liquefied gases. The device is substantially constituted by an upper connecting body which can be coupled to a cylinder for liquefied gases and forms a tubular gas infeed element which ends with a coupling body which can be coupled to a lower connecting body, so as to retain an elastic membrane for closing the openings arranged on the coupling body outside the tubular body.

The membrane, which has through holes, connects the tubular element to a chamber inside which a valve control element is provided which is controlled by a float element, which is provided with an actuation cam for the control element, which is meant to let the control element descend, when the cylinder has been filled to the intended level, so as to close the chamber, so that the counterpressure generated inside the chamber pushes the membrane hermetically against the tubular element in order to close the openings for feeding gas toward the inside of the cylinder.

In this embodiment, it is important for the coupling between the upper connecting body and the lower connecting body to be produced with an excellent seal and with the possibility of clamping the peripheral region of the membrane in order to retain it in position.

In the embodiments of the prior art, the coupling is normally performed by heat-sealing or gluing. The effectiveness of these processes is not easy to control and therefore it is not possible to be absolutely certain of a complete and durable clamping action on the edge of the membrane, which if not firmly retained in its peripheral region can create seepage regions, with consequent failure of the valve device.

SUMMARY OF THE INVENTION

The aim of the present invention is to eliminate the above-mentioned drawbacks, providing a valve device for controlling the filling level of cylinders and the like with liquefied gases which is capable of ensuring precise coupling of the membrane to the connecting bodies with an absolute assurance of tightness.

Within the scope of this aim, a particular object of the present invention is to provide a valve device which allows to precisely clamp the peripheral region of the membrane without thereby having to modify the typical structure of the valve device.

Another object of the present invention is to provide a valve device which by virtue of its particular constructive characteristics is capable of giving the greatest assurances of reliability and safety in use.

Another object of the present invention is to provide a valve device which can be easily obtained starting from commonly commercially available elements and materials and is also competitive from a purely economical point of view.

This aim, these objects and others which will become apparent hereinafter are achieved by a valve device for controlling the filling level of cylinders and the like with liquefied gases, according to the present invention, comprising an upper connecting body which can be coupled to a cylinder for liquefied gases and forming a tubular gas infeed element which ends with a coupling body which is associable with a lower connecting body in order to retain a membrane for closing openings for feeding gas into said cylinder, a valve control element being also provided which is controlled by a float which interacts with said membrane, characterized in that it comprises clinching means for mutual clamping of said upper connecting body and said lower connecting body.

BRIEF DESCRIPTION OF THE DRAWINGS

Further characteristics and advantages of the present invention will become apparent hereinafter from the following detailed description of a preferred but not exclusive embodiment of a valve device for controlling the filling level of cylinders and the like with liquefied gases, illustrated only by way of non-limitative example in the accompanying drawings, wherein:

FIG. 1 is a schematic view of the valve device according to the present invention;

FIG. 3 is a top plan view of the lower connecting body;

FIG. 4 is a schematic perspective view of the clinching collar.

DESCRIPTION OF THE PREFERRED EMBODIMENTS

Figure 2:
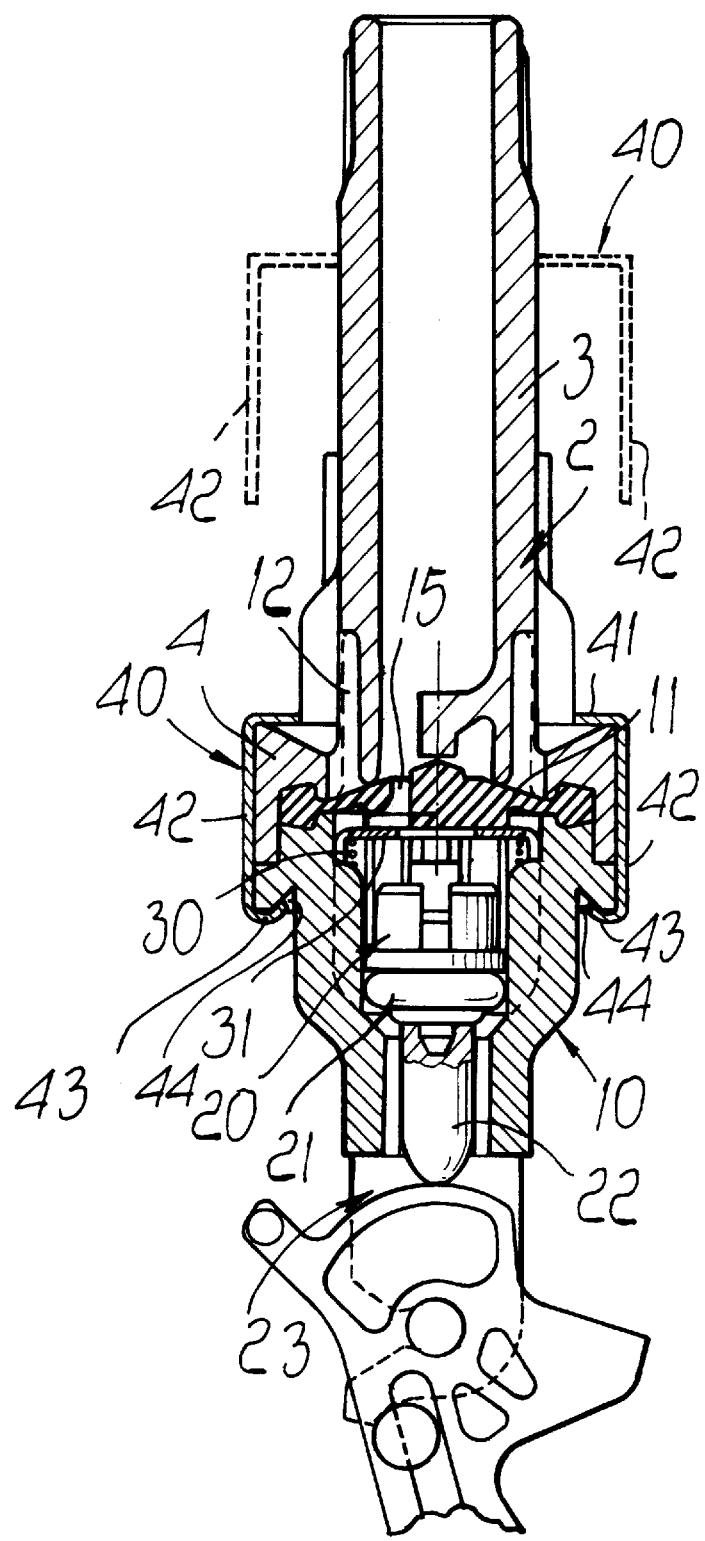
FIG. 2 is a sectional view of the valve device.

With reference to the above figures, the valve device for controlling the filling level of cylinders and the like with liquefied gases, according to the present invention, generally designated by the reference numeral 1, comprises an upper connecting body 2 which is constituted by a tubular element 3 which can be connected to a cylinder of liquefied gas and forms, in a downward region, a coupling body 4.

The coupling body 4 is meant to allow coupling to a lower connecting body 10 in order to retain a membrane 11 which, as will become apparent hereinafter, is capable of engaging the end of the tubular element so as to close hermetically openings 12 for feeding gas into the cylinder, which are provided externally and peripherally with respect to the tubular element 3.

The chamber formed by the coupling between the upper connecting body 2 and the lower connecting body 10 accommodates a valve control element 20 which is provided with a sealing O-ring 21. O-ring 21 has a lower tab 22 which interacts with a cam-like portion 23 of a float element 24 which is supported so as to oscillate by the lower body.

The membrane 11 is provided with through holes 15 which connect the inside of the tubular element 3 to the chamber that accommodates the valve control element 20, so that when no pressure is generated inside the chamber because the valve control element does not close the chamber in a downward region, the membrane is pushed downward in contrast with the action of a spring 30 which acts on a washer 31 which pushes the membrane.

When the preset filling level is reached, the cam-like portion 23 allows the descent of the valve control element 20, so that in the chamber formed between the lower connecting body 10 and the upper connecting body 2 there forms a counterpressure which pushes the membrane hermetically against the end of the tubular body.

In order to firmly retain the membrane, and as a particular characteristic of the present invention, there are provided clinching means which mutually clamp the upper connecting body 2 and the lower connecting body 10, retaining between them the peripheral region of the membrane 11 and thus producing a perfect seal.

The clinching means are formed by means of a clinching collar 40 provided with an annular portion 41 which peripherally engages above the coupling body 4 and is provided with tabs 42 with a tapering point 43 which protrude axially, so as to lie laterally adjacent to the body 4 and to the end portion of the lower connecting body.

The ends of the tabs 42 can be clinched by bending, so as to insert the ends in recesses 44 formed in the lower connecting body, so that a precise mechanical clamping action is applied.

The coupling body 4 and the end part of the lower connecting body 10 are peripherally provided with grooves 50 which are uniformly distributed circumferentially and are meant to correctly accommodate the tabs 42.

With the described arrangement, therefore, a mechanical clamping action is applied between the two elements to be hermetically coupled which allows to have an optimum sealing action on the peripheral region of the membrane.

It should also be added that it is optionally possible, in addition to the clinching means, to weld or glue the lower connecting body 10 to the upper connecting body 2, so as to always have absolute certainty of a precise seal.

From the above description it is thus evident that the invention achieves the intended aim and objects, and in particular the fact is stressed that the clamping collar allows to apply a mechanical action for mutually clamping the two parts to be coupled with the assurance of compressing the peripheral region of the membrane, which is accordingly capable of always producing a perfect seal.

The invention thus conceived is susceptible of numerous modifications and variations, all of which are within the scope of the inventive concept.

All the details may also be replaced with other technically equivalent elements.

In practice, the materials used, as well as the contingent shapes and dimensions, may be any according to requirements.

The disclosures in Italian Patent Application No. MI198A002184 from which this application claims priority are incorporated herein by reference.

What is claimed is:

1. A valve device for controlling the filling level of cylinders and the like with liquified gases, the device comprising:

an upper connecting body which can be coupled to a cylinder for liquified gas, the upper connecting body having a tubular gas infeed element which terminates in a coupling body which associates with a lower connecting body in order to retain a membrane for closing openings for feeding gas into the cylinder, the device further including a valve control element which is controlled by a float and interacts with the membrane, the device including clinching means for mutual clamping of the upper connecting body and the lower connecting body, wherein the clinching means comprises a clinching collar provided with an annular portion which peripherally engages above the coupling body, the clinching collar having a plurality of tabs which protrude substantially axially and serve to clamp the upper and lower connecting bodies relative to one another.

2. The valve device according to claim 1, wherein the tabs have a tapering point and the collar slides along at least a portion of the upper connecting body and the lower connecting body, an upper portion of the collar resting on an upper surface of the upper connecting body.

3. The valve device according to claim 2, wherein the lower connecting body includes a plurality of recesses for the insertion of the tapering points of the tabs, the tapering points being bent into the recesses.

4. The valve device according to claim 1, wherein the upper connecting body and the lower connecting body are peripherally provided with grooves which are uniformly distributed circumferentially in order to slidingly accommodate the tabs for aligning the upper and lower connecting bodies together.

5. The valve device according to claim 1, wherein the openings are formed in the upper connecting body.

6. A valve device for controlling the filling level of a gas cylinder, the device comprising:

an upper connecting body having a first end and an opposing second end, the first end for attachment to the gas cylinder, a portion of the upper connecting body being a gas infeed element which terminates with a coupling body at the second end;

a lower connecting body which seats against the upper connecting body to form a chamber therebetween;

a membrane disposed between the upper and lower connecting bodies, the membrane serving to selectively close openings for feeding gas into the cylinder;

a valve control element disposed within the chamber, the valve control element being controlled by a float, the valve control element interacting with the membrane so that when no pressure is generated inside the chamber, the membrane is pushed downward until a preset filling level is reached at which time the valve control element descends resulting in the membrane being disposed hermetically against the second end of the upper connecting body; and a clinching collar for mutual clamping of the upper connecting body and the lower connecting body, the clinching collar having an annular portion which peripherally engages above the coupling body and a plurality of tabs protrude substantially axially and serve to retain the upper and lower connecting bodies relative to one another.

* * * * *

UNITED STATES PATENT AND TRADEMARK OFFICE
CERTIFICATE OF CORRECTION

PATENT NO. : 6,079,438
DATED : June 27, 2000
INVENTOR(S) : Carlo Cavagna

It is certified that error appears in the above-identified patent and that said Letters Patent is hereby corrected as shown below:

<u>Title page,</u>
Item [30], Foreign Application Priority Data, after "Italy….." delete "MI98A2184" and insert therefor -- MI98A002184 --

<u>Column 3,</u>
Line 43, delete "MI198A002184" and insert therefor -- MI98A002184 --

<u>Column 4,</u>
Line 56, after claim 6, insert the following claims, -- 7. The valve device according to claim 6, wherein each of the plurality of tabs includes a tapering point, the collar sliding along at least a portion of the upper connecting body and the lower connecting body, an upper portion of the collar resting on an upper surface of the upper connecting body.

8. The valve device according to claim 7, wherein the lower connecting body includes a plurality of recesses for the insertion of the tapering points, the tapering points being bent into the recesses for clamping the upper and lower connecting bodies relative to one another.

9. The valve device according to claim 6, wherein the plurality of tabs lying adjacent to the coupling body of the upper connecting body and to an end portion of the lower connecting body.

10. The valve device according to claim 6, wherein the coupling body and an end portion of the lower connecting body are peripherally provided with grooves which are uniformly distributed circumferentially in order to slidingly accommodate the plurality of tabs for aligning the upper and the lower connecting bodies together.

11. The valve device according to claim 6, wherein the membrane includes a plurality of through holes which provide fluid communication between an inside of the gas infeed element and to the chamber.

UNITED STATES PATENT AND TRADEMARK OFFICE
CERTIFICATE OF CORRECTION

PATENT NO.    : 6,079,438
DATED         : June 27, 2000
INVENTOR(S)   : Carlo Cavagna It is certified that error appears in the above-identified patent and that said Letters Patent is hereby corrected as shown below:

<u>Column 4 (cont'd)</u>,

12. The valve device according to claim 6, wherein the valve control element includes a sealing O-ring, the O-ring having a lower tab which interacts with a cam-like portion of the float which is supported so as to oscillate relative to the lower connecting body. --

Signed and Sealed this

Twenty-second Day of February, 2005

JON W. DUDAS
*Director of the United States Patent and Trademark Office*